March 15, 1938. O. W. BECKER 2,111,273
METHOD OF CLOSING THE ENDS OF A SAUSAGE SKIN
Filed Sept. 29, 1934 2 Sheets-Sheet 1
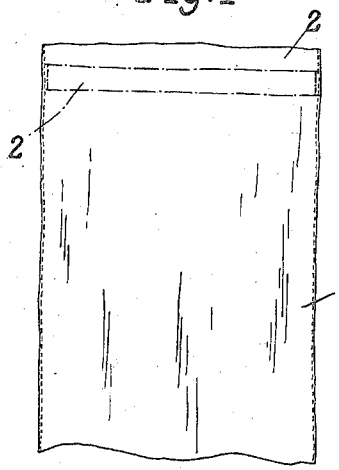
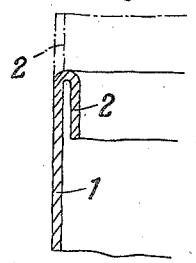
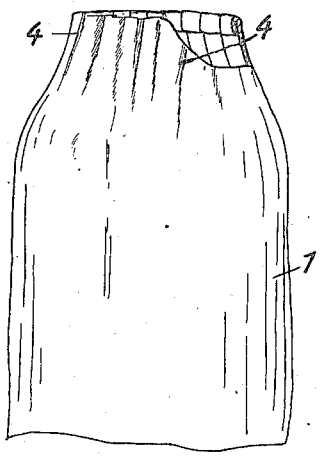
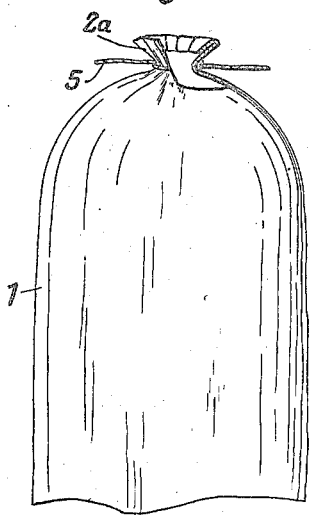
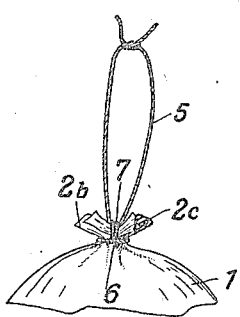
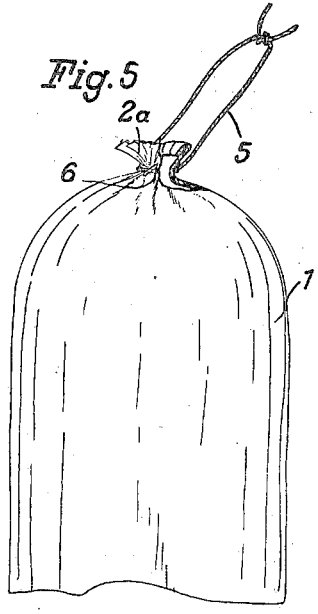
Inventor:
Oskar Walter Becker
by Bailey & Carson
Attorneys March 15, 1938. O. W. BECKER 2,111,273
METHOD OF CLOSING THE ENDS OF A SAUSAGE SKIN
Filed Sept. 29, 1934 2 Sheets—Sheet 2

Inventor:
Oskar Walter Becker
by Bailey & Cranson
Attorneys

Patented Mar. 15, 1938

2,111,273

UNITED STATES PATENT OFFICE 2,111,273

METHOD OF CLOSING THE ENDS OF A SAUSAGE SKIN

Oskar Walter Becker, Weinheim an der Bergstrasse, Germany, assignor to the firm Naturin Gesellschaft mit beschränkter Haftung, Weinheim an der Bergstrasse, Germany Application September 29, 1934, Serial No. 746,248
In Germany July 27, 1933

10 Claims. (Cl. 99—175)

This invention relates to a method of closing the ends of a sausage skin, and particularly of an artificial sausage skin, in the known manner by drawing a cord or the like around the end to be closed and forming at least one knot.

According to the invention, the edge of the end of the sausage skin to be closed is reinforced or thickened to produce several layers, and after the reinforced edge has been folded in known manner the string is wound around and tied into a knot in such a way that the reinforced edge is positioned outside the knot at the free end and forms there a thick tip. The edge is preferably reinforced by being turned over towards the inside, and it will usually suffice to turn it over only once, so that the reinforced edge constitutes a double layer. The invention further covers the sausage skin closed in the manner indicated, and also extends to measures for preventing the turned-over edge of the end of the sausage skin from automatically returning to initial position owing to the elasticity of the material from which the sausage skin is made.

Figure 7:
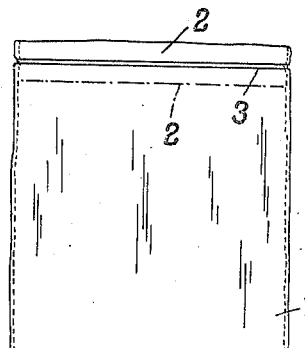
Figure 8:
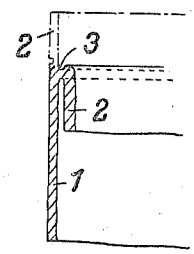
Figure 8A:
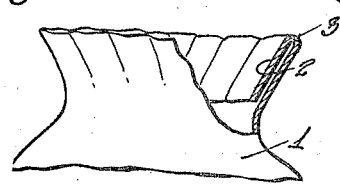
Figure 10A:
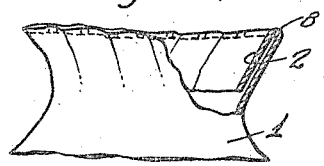
Figure 9:
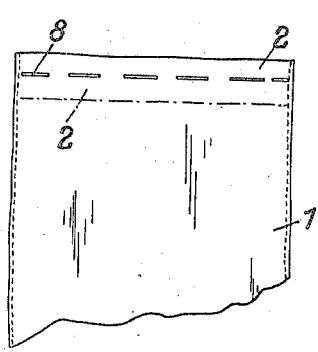
Figure 10:
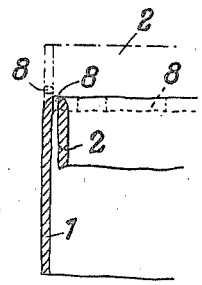

By way of example, the invention is diagrammatically illustrated in the accompanying drawings, in which Figure 1 is a view of the end of the sausage skin to be closed in open condition before being folded; Fig. 2, a view on a larger scale of the turned-over edge of the skin; Fig. 3, a view partly in section of the end of the sausage skin having a reinforced edge and being drawn together by folding; Fig. 4 shows partly in section how the string is placed around the end of the sausage skin to be closed; Fig. 5 shows partly in section the end of the sausage skin when it is fully closed; Fig. 6 shows partly in section a modified way of forming the knot; Fig. 7 shows the open end of a sausage skin in a modified form; Fig. 8 shows the modified structure of Fig. 7 after the edge has been turned over; Fig. 8a shows partly in section the upper portion of a bag of the structure shown in Figs. 7 and 10 with the string tied thereon; Figs. 9 and 10 show, respectively, the open end and the turned-over edge of another modification; and Fig. 10a shows partly in section the upper portion of a bag formed according to Figs. 9 and 10 with the string tied thereon.

Referring to the drawings, the sausage skin 1, which may be artificially produced for instance by working up fibrous material from hide substance, has the form of an endless tube open on both ends. If the end of the skin 1 shown is to be closed, the edge 2 thereof is turned over first to reinforce it by the double layer formed. The edge 2 is preferably turned over towards the inside, as indicated in Fig. 2, whereupon the folds 4 are formed and the end to be closed is firmly collected, as shown in Fig. 3. The next step as shown in Fig. 4 is to place or wind the string 5 around the end to be closed, so that the double folded edge 2a is located outside the string 5 or the knot to be formed at the free extremity of the sausage skin, where it forms a thick end, as shown in Fig. 5.

This thick end prevents the string 5 from slipping off the skin 1 when the sausage is suspended from the string, and causes the string provided with a knot to hold the skin even if it has to carry the weight of the filled skin in moist condition. According to the known methods of closing sausage skins, particularly artificial ones, it was not possible to secure the string to the sausage skin in such a way that always and in all circumstances it would carry the full weight of the filled skin in moist condition, and it often happened that the string slipped off from the end of the skin or the latter broke. This could be observed particularly when the edge of the sausage skin had been weakened during the closing operation, e. g., by a needle passed through it for introducing the string, etc.

The hold of the string relative to the end of the skin can be enhanced in known manner by passing the string once again over the end 2a and, besides the first knot 6, forming a second knot 7, as shown in Fig. 6. In this instance, the end is divided by the string 5 into the two parts 2b and 2c, as clearly discernible in Fig. 6.

The edge 2 may be turned over several times to increase the reinforcement or thickening of the end formed after tying and thus attain still greater carrying capacity and durability.

The reinforcement or thickening of the edge 2 can be effected also in some other way than by turning. For example, one or several layers may be pasted to the edge or secured thereto in some other manner.

The turning of the edge or the application of a second layer may be effected by hand or machinery.

The invention is applicable not only to sausage skins but to other tubular endless casings of similar kind as well.

As it has been found that the edges cannot always be turned by hand in a perfectly uniform manner and as the material, especially in artificial sausage skins, possesses considerable elasticity, so that the turned-over edge tends to return to initial position, it is sometimes impossible to effect a reliable closure. Furthermore, it happens that the filled sausage skin, particularly if suspended from the string in moist condition, becomes detached from the string when the knot slips out of the latter.

The invention prevents such accidents by weakening the place where the edge is to be folded prior to turning. If the edge is to be turned inside, this can be done for instance, according to Figs. 7, 8, and 8a, by producing by milling or scoring a groove or depression 3 on the outside at a suitable distance from the outer edge 2, say, at about one-quarter of an inch from the latter. This groove 3 will limit the sausage skin at the outer end after the edge has been turned, as indicated in Figs. 8 and 8a. In this way, the folding point is clearly marked and the edge can be conveniently turned over on all sides before the skin is filled. Moreover, owing to the weakening of the material, the edge will not move back into its original position during folding.

Figs. 9, 10 and 10a disclose another embodiment of the invention, in which instead of the groove 3 a line of perforation 8 is provided at a suitable distance from the edge 2 of the skin 1. This method affords the advantage that the edge cannot be separated in case of improper handling and turning over may be effected towards one side or the other.

The end of the sausage skin can be folded and tied in the manner described as shown in Fig. 10a. Either both ends of the skin or only one end are closed according to the invention, the other end being closed in known manner.

I claim:—

1. A method of closing the end of a sausage casing, which consists in turning and folding over the end of the skin upon itself only once without securing the folded over part to the body of the casing, and tying a string around the casing below such turned over portion, whereby a reinforced and thickened edge is formed outside the string at the free extremity of the casing.

2. A method of closing the end of a sausage casing, which consists in turning and folding over the end of the skin inwardly upon itself without securing the folded over part to the body of the casing, and tying a string around the casing below such turned over portion, whereby a reinforced and thickened edge is formed outside the string at the free extremity of the casing.

3. A method of closing the end of a sausage skin, which consists in weakening the skin along a line adjacent the end to be closed, turning over the edge portion of the end along the line of weakening, whereby a reinforced and thickened edge is formed at the free end of the skin, and tying a string around the skin below said turned over portion.

4. A method of closing the end of a sausage skin, which consists in weakening the skin along a line adjacent the end to be closed, turning inwardly the edge portion of the end along the line of weakening, whereby a reinforced and thickened edge is formed at the free end of the skin, and tying a string around the skin below said inwardly turned portion.

5. A method of closing the end of a sausage skin, which consists in perforating the skin along a line adjacent the end to be closed in order to weaken the same, turning over the edge portion of the end along the line of perforation, whereby a reinforced and thickened edge is formed at the free end of the skin, and tying a string around the skin below said turned over portion.

6. A sausage skin having the edge portion adjacent its free end folded over upon itself only once and unsecured to the body of the skin, and a string tied around the free end below said folded over portion.

7. A sausage skin having the edge portion adjacent its free end folded over, said skin being weakened along the line of folding, and a string tied around the skin below the folded over portion thereof.

8. A sausage skin having the edge portion adjacent its free end folded inwardly, said skin being weakened along the line of folding, and a string tied around the skin below the folded over portion thereof.

9. A sausage skin having the edge portion adjacent its free end folded inwardly, said skin being perforated along the line of folding, and a string tied around the skin below the folded over portion thereof.

10. A sausage skin having the edge portion adjacent its free end folded over inwardly upon itself and unsecured to the body of the skin, and a string tied around the free end below said folded over portion.

OSKAR WALTER BECKER.